United States Patent
Filippi

(10) Patent No.: US 9,486,731 B2
(45) Date of Patent: Nov. 8, 2016

(54) PROCESS FOR REMOVING CARBON DIOXIDE FROM A GAS STREAM

(71) Applicant: Casale SA, Lugano-Besso (CH)

(72) Inventor: Ermanno Filippi, Castagnola (CH)

(73) Assignee: Casale SA (CH)

( * ) Notice: Subject to any disclaimer, the term of this patent is extended or adjusted under 35 U.S.C. 154(b) by 0 days.

(21) Appl. No.: 14/384,985

(22) PCT Filed: Jan. 11, 2013

(86) PCT No.: PCT/EP2013/050453
§ 371 (c)(1),
(2) Date: Sep. 12, 2014

(87) PCT Pub. No.: WO2013/135398
PCT Pub. Date: Sep. 19, 2013

(65) Prior Publication Data
US 2015/0059573 A1    Mar. 5, 2015

(30) Foreign Application Priority Data

Mar. 13, 2012  (EP) .................................... 12159286

(51) Int. Cl.
B01D 53/04    (2006.01)

(52) U.S. Cl.
CPC ..... B01D 53/0462 (2013.01); B01D 2257/504 (2013.01); B01D 2259/402 (2013.01); B01D 2259/65 (2013.01); Y02C 10/08 (2013.01)

(58) Field of Classification Search
CPC .................... B01D 53/0462; B01D 2257/504; B01D 2259/402; B01D 2259/65; Y02C 10/08
USPC ............ 95/114, 115, 139, 148; 96/121, 126, 96/146
See application file for complete search history.

(56) References Cited

U.S. PATENT DOCUMENTS

| | | | |
|---|---|---|---|
| 3,087,291 A * | 4/1963 | Jackson | ..................... C07C 7/12 95/136 |
| 3,568,406 A | 3/1971 | Dynes | |
| 4,696,681 A * | 9/1987 | LLoyd-Williams | ............. B01D 53/047 95/115 |
| 5,213,593 A * | 5/1993 | White, Jr. | .......... B01D 53/0462 95/99 |
| 5,520,894 A | 5/1996 | Heesink et al. | |
| 5,658,369 A | 8/1997 | Kusay | |
| 5,846,295 A | 12/1998 | Kalbassi et al. | |
| 2003/0037672 A1* | 2/2003 | Sircar | ................ B01D 53/0462 95/96 |
| 2009/0282866 A1 | 11/2009 | Kawai et al. | |

FOREIGN PATENT DOCUMENTS

EP    1249264 A1    10/2002
GB    1071453 A    6/1967

OTHER PUBLICATIONS

International Preliminary Report on Patentability issued in connection with PCT/EP2013/050453.
International Search Report issued in connection with PCT/EP2013/050453.

* cited by examiner

*Primary Examiner* — Frank Lawrence
(74) *Attorney, Agent, or Firm* — Akerman LLP

(57) ABSTRACT

A process and equipment for removing carbon dioxide from a process gas (G), with a solid adsorbent and temperature swing adsorption, where the carbon dioxide is removed from process gas in either a first bed (B1) or a second bed (B2) of adsorbent, while the other bed is regenerated with heat furnished by the incoming hot process gas; the beds are contained in vessels (V1, V2) with heat exchange tubes or plates (T1, T2), so that the removal of CO2 takes place by contacting the process gas with the bed in the shell side, and regeneration of a bed takes place by passing the hot process gas inside the tubes.

14 Claims, 3 Drawing Sheets

PROCESS FOR REMOVING CARBON DIOXIDE FROM A GAS STREAM

This application is a national phase of PCT/EP2013/050453, filed Jan. 11, 2013, and claims priority to EP 12159286.9, filed Mar. 13, 2012, the entire contents of both of which are hereby incorporated by reference.

FIELD OF THE INVENTION

The present invention relates to a process for removing carbon dioxide from a process gas, for example fumes of a reformer or stack emissions of a fossil fuel plant. The invention relates to a process based on temperature-swing adsorption of carbon dioxide on a solid adsorbent.

PRIOR ART

Removing carbon dioxide from the fumes of a combustion process or other oxidative process is desirable for environmental concerns and/or for use of carbon dioxide as a raw material of another industrial process. In the field of ammonia and methanol synthesis, the reforming of methane or other light hydrocarbons such as natural gas, LPG (liquefied petroleum gas), naphtha, etc. is a common source for ammonia or methanol make-up synthesis gas, and there is a need to remove at least part of the carbon dioxide contained in the fumes of the reforming process.

The so-called "wet" processes involve scrubbing of the process gas with a CO2-selective solution. However they suffer the drawbacks of degradation of the scrubbing solution, for example due to oxidation or reaction with sulphur and nitric oxides leading to salts or harmful compounds. The scrubbing solution needs to be replaced thus involving costs and/or maintenance is required to remove salts or harmful compounds.

Another known processes make use of a solid adsorbent and operate according to principles of pressure swing adsorption (PSA) or temperature swing adsorption (TSA). The capture and subsequent release of the CO2 are governed by a change of pressure in a PSA system and by a change of temperature in a TSA system. More in detail, the amount of CO2 that can be retained by the adsorbent is a function of pressure or temperature. Hence the captured CO2 can be removed at a later stage by an appropriate change of pressure or temperature. Removing adsorbate (such as CO2) from a solid adsorbent is called regeneration of the adsorbent. In a TSA system, adsorption takes place usually at a lower temperature and regeneration takes place at a higher temperature. This means that the adsorbent material of a TSA system needs a heat source for regeneration and usually must be cooled after regeneration.

EP-A-1249264 discloses a process for the recovery of carbon dioxide from waste gas, comprising the steps of: letting the waste gas flow permeate into a semi-permeable material such as TSA molecular sieve or activated carbon, in such a way to adsorb at least a relevant portion of the carbon dioxide in the waste gas, and to obtain a permeated gas flow with low carbon dioxide content, and desorbing the carbon dioxide from said semi-permeable material, thus obtaining a gaseous flow comprising high concentrated carbon dioxide.

The present invention is aimed to improve the known technique of CO2 removal with TSA adsorption. In particular, the TSA process requires alternate phases of heating and cooling the solid adsorbent in order to carry out the adsorption and regeneration (desorption), respectively. This can be made with direct heat exchange or indirect heat exchange.

A direct heat exchange involves that the solid adsorbent is directly contacted with a heating medium or a cooling, medium. Direct heating has the advantage that the heating medium provides a carrier for the desorbed carbon dioxide, but the same heating medium dilutes the carbon dioxide. Hence there is the need of an additional system to remove CO2 from the heating medium, especially if pure or substantially pure CO2 is desired.

Indirect heat exchange involves that the solid adsorbent and heating/cooling medium are not in contact and remain separate by heat exchange surfaces, for example the heating/cooling medium is flowing in a tube bundle immersed in the bed of adsorbent. This method does not dilute the CO2 but, has a drawback in that, during the heating phase, it does not provide a carrier to sweep out the CO2 from the bed. In some cases an additional purge flow is passed through the bed, in order to remove the desorbed carbon dioxide, but this causes the same disadvantages of the direct heating process.

SUMMARY OF THE INVENTION

The invention provides a process for removing carbon dioxide from a process gas and with a solid adsorbent and temperature swing adsorption, by means of at least two beds or groups of beds of solid adsorbent. The process alternates two modes of operation. In a first mode, the first bed(s) are regenerated by indirect heat exchange with the incoming process gas, and then the CO2 is captured in the (previously regenerated) second bed(s). Once the second bed(s) are saturated with CO2, the process switches to a second mode, now regenerating the second bed(s) by the indirect heat exchange with the incoming hot process gas, and then capturing the CO2 in the first beds. The bed adsorbing CO2 can be continuously cooled during the adsorption phase, in order to remove the adsorption heat, increasing the amount of CO2 being adsorbed.

In a greater detail, the invention discloses a process where:

carbon dioxide removal from said process gas takes place alternately in at least a first bed of said solid adsorbent and at least a second bed of said solid adsorbent, the first bed being regenerated while carbon dioxide contained in the incoming process gas is adsorbed in the second bed and vice-versa, so that the adsorbent of first bed and of the second bed is alternately loaded with carbon dioxide, the incoming process gas is cooled by an indirect heat exchange with the CO2-loaded adsorbent material of either the first bed or the second bed, thus heating and regenerating said CO2-loaded adsorbent, and carbon dioxide is then removed from the process gas while contacting said process gas with adsorbent material of the other bed.

In a particularly preferred embodiment, the bed(s) of CO2-loaded adsorbent are kept in a closed environment during the regeneration step. As a consequence, the heating of the CO2-loaded adsorbent take place in a closed volume (iso-volumic condition), which means that pressure inside said closed volume increases while the carbon dioxide is progressively released. This preferred embodiment has the notable advantage that the carbon dioxide, or a carbon dioxide-containing gas, is made available under pressure and this pressure helps to evacuate the carbon dioxide without the need of a carrier or the need of a compressor.

More preferably, the heating of the adsorbent is maintained while the CO2 released by the adsorbent leaves said closed environment, in order to keep a substantially constant temperature of said closed environment while the pressure is being reduced.

According to preferred embodiments, the adsorbent beds are hosted in the shell side of respective vessels. A shell side of a vessel can form said closed environment, upon the closure of the related connections with the outside (e.g. valves). More preferably, each vessel includes heat exchange bodies such as tubes or plates immersed in the bed. Said heat exchange bodies define a path separated from the outside adsorbent bed. The indirect heat exchange between the process gas and CO2-loaded adsorbent is effected by feeding the gas to heat exchange bodies, for example inside tubes or hollow plates.

While regeneration of a bed is in progress, any connection of the shell side is closed, in such a way that the shell side defines a closed volume and released carbon dioxide accumulates under pressure. Once the regeneration is complete, a discharge line can be opened and carbon dioxide in pressure leaves the shell side of said bed, while the hot process gas on the tube or plate side continues to flow to maintain the temperature of the adsorbent while the pressure is dropping. Accordingly, heating of the adsorbent is maintained while the released CO2 is being removed from the shell side of the vessel, in order to keep a stable temperature in the shell side, while the pressure is being reduced due to CO2 leaving the vessel.

Optionally, the process gas is subject to a second cooling process, after said indirect heat exchange with the CO2-loaded adsorbent, and before contact with the previously regenerated adsorbent for CO2 removal. This second and additional cooling may be effected with cooling water or air and typically serves to cool the process gas to ambient temperature or slightly above ambient temperature, which is suitable for CO2 removal. Preferably said temperature is less than 50° C. and more preferably 20-40° C. Condensed water may also be removed during this second cooling.

Once a bed is regenerated, the bed is at a high temperature, for example 200° C., and is preferably cooled before it can receive the CO2-containing process gas. This cooling of the regenerated bed can be made by feeding a cooling medium in the aforesaid heat exchange bodies. Even more preferably, said cooling medium is a stream of de-carbonated gas previously obtained by means of the CO2 removal in the other bed. During CO2 adsorption the adsorbing bed can be indirectly cooled to remove the adsorption heat.

It shall be understood that any references to a bed or a vessel may equally apply to a group or array of beds or vessels, for example in parallel. The term of CO2-loaded adsorbent is used to denote the adsorbent which has captured some CO2 or is saturated with CO2. The term decarbonated gas denotes the process gas after CO2 capture and which has a lower CO2 content than the incoming gas; in some embodiments and according to the degree of removal of the carbon dioxide, said decarbonated gas is substantially a CO2-free gas.

The incoming process gas is generally a hot gas and may come from a combustion or oxidation process, including fumes of a reformer, waste gas of a furnace, fumes of a power plant, etc. Usually the temperature of the gas current available to the CO2 removal process of the invention is at least 80° C. and preferably in the range 100-300° C., more preferably 150-250° C. Waste gas or fumes at a higher temperature are normally cooled during previous steps like heat recovery, filtering, removal of pollutants, etc. The term process gas in this description may refer to combustion gases which are processed in order to remove carbon dioxide. Said process gas can be for example the flue gases from the stack of a primary reformer in an ammonia or methanol production plant.

An object of the invention is also an equipment for carrying out the process. Said equipment preferably comprises at least a first vessel for carbon dioxide removal, containing a first bed of solid adsorbent material and first heat exchange bodies immersed in said first bed, at least a second vessel for carbon dioxide removal, containing a second bed of solid adsorbent material and second heat exchange bodies immersed in said second bed. The heat exchange bodies define an inside path for a heat exchange medium, and each of said vessel has a shell side and a heat-exchanger side, so that a medium flowing in the shell side being in direct contact with the adsorbent material, and a medium in the heat-exchanger side being separated from the adsorbent material. The equipment also comprises means for selective direction of an incoming stream of a process gas containing carbon dioxide either:

according to a first path where the incoming process gas passes first in the heat-exchange side of the first vessel for regeneration of the adsorbent material in the first vessel, and afterwards in the shell side of the second vessel for CO2 removal, or according to a second path where the incoming process gas passes first in the heat-exchange side of the second vessel for regeneration of the adsorbent material in the second vessel, and afterwards in the shell side of the first vessel for CO2 removal.

The main advantages of the invention are that the process can run continuously, because regeneration of a first bed or a first group of beds can take place while, at the same time, the CO2 of the process gas is captured in a second bed or group of beds. Another advantage is the efficient exploitation of heat: the incoming hot process gas is the heat source for regeneration of saturated beds, while in some embodiments the cold, decarbonated gas leaving the adsorption process can be used to cool the bed after regeneration, and hence recover part of the heat of the bed. Yet another advantage, as stated before, is that released CO2 is available at a certain pressure and can be discharged without a carrier such as steam or purge gas. Moreover, CO2 is not diluted and available with high purity, which is a significant advantage whenever the CO2 is directed to a further use.

The advantages of the invention will be elucidated with the help of the following description of preferred and non-limiting embodiments.

DETAILED DESCRIPTION OF PREFERRED EMBODIMENTS

Figure 1:
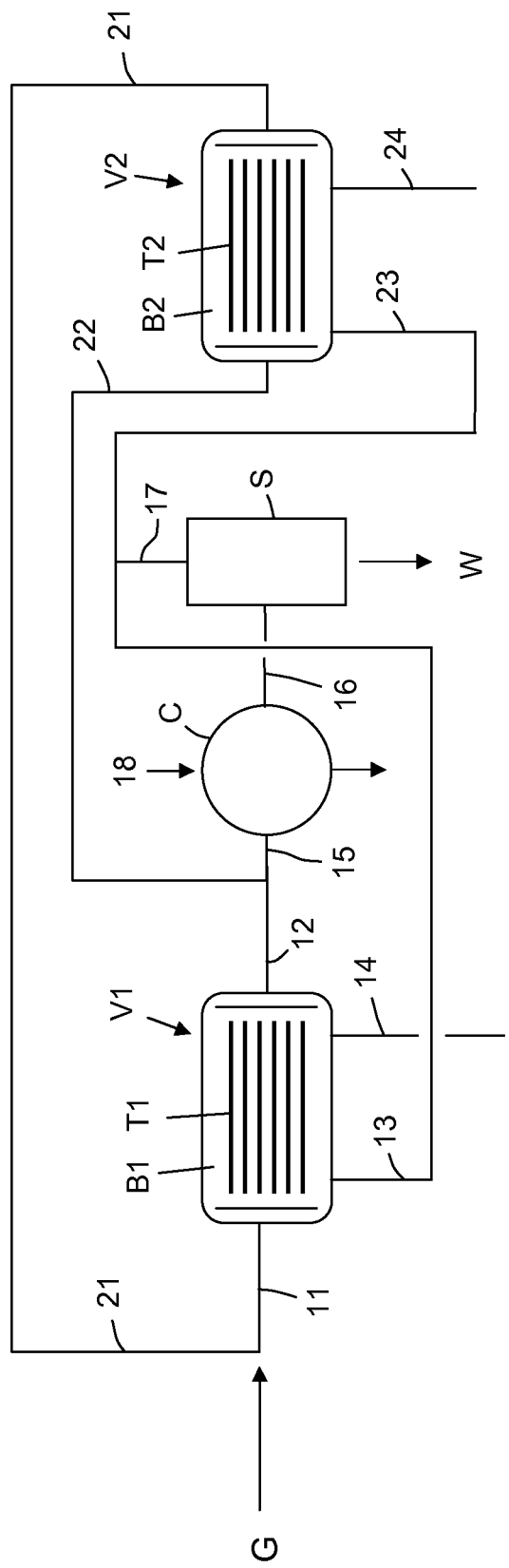
FIG. 1 is a block diagram of a CO2 removal section according to a preferred embodiment of the invention.

Referring to FIG. 1, the main items of the CO2 removal section are a first vessel V1, a second vessel V2, a cooler C and a separator S. Vessels V1 and V2 contain beds B1 and B2 of adsorbent material suitable for removal of CO2 from a gas phase with a TSA process. Each of vessels V1, V2 also contains a heat exchange tube bundle T1, T2 immersed in the adsorbent bed.

Hence the vessels V1, V2 have a tube side (inside tubes) and a shell side (inside the vessel and outside tubes). The shell side contains the adsorbent bed and the tube side defines a path for a heating or cooling medium. The shell side and tube side are not in communication inside the vessels.

Lines 11, 12 are in communication with the tube side of the vessel V1 (i.e. with the inside of tubes T1), while lines 13, 14 are in communication with the shell side. In a similar way, lines 21, 22 are in communication with the tube side of the vessel V2, namely with inside of tubes T2, and lines 23, 24 are in communication with the shell side of vessel V2.

A hot process gas containing CO2 is denoted as G. The incoming gas G can be directed either in the tube side of the first vessel V1 via line 11, or in the tube side of the second vessel V2 via line 21. The process gas flowing inside tubes T1 or T2 provides heat for regeneration of the respective adsorbent bed B1 or B2. Regeneration follows the TSA principle, since the amount of CO2 adsorbed in bed depends on temperature. At the same time the process gas is cooled, for example from a typical inlet temperature of 150-200° C. to an intermediate temperature of 60-80° C.

Temperature of the process gas leaving the tubes of vessel V1 (or V2) is further lowered in the cooler C and condensed fluid, containing mainly water, W can be separated in the separator S. The process gas leaving the top of separator S, at around ambient temperature, enters the shell side of the other vessel V2 (or, respectively, V1) where it is contacted with the adsorbent bed for removal of CO2.

In other words, the CO2 is removed from the process gas in one bed, while the other bed is being regenerated with heat furnished by the same process gas. Hence the CO2 removal section has two modes of operation. The incoming gas G can be directed to line 11 or line 21, which means to tube side of vessel V1 or V2. Accordingly, after passage in one or another tube bundle, the process gas can reach the input line 15 of the cooler C via line 12 or via line 22. The process gas leaving the head of separator S via line 17 can be directed to line 13 or 23, hence to side shell of V1 or V2. A number of valves (not shown) allow a selective direction of the flow.

Figure 2:
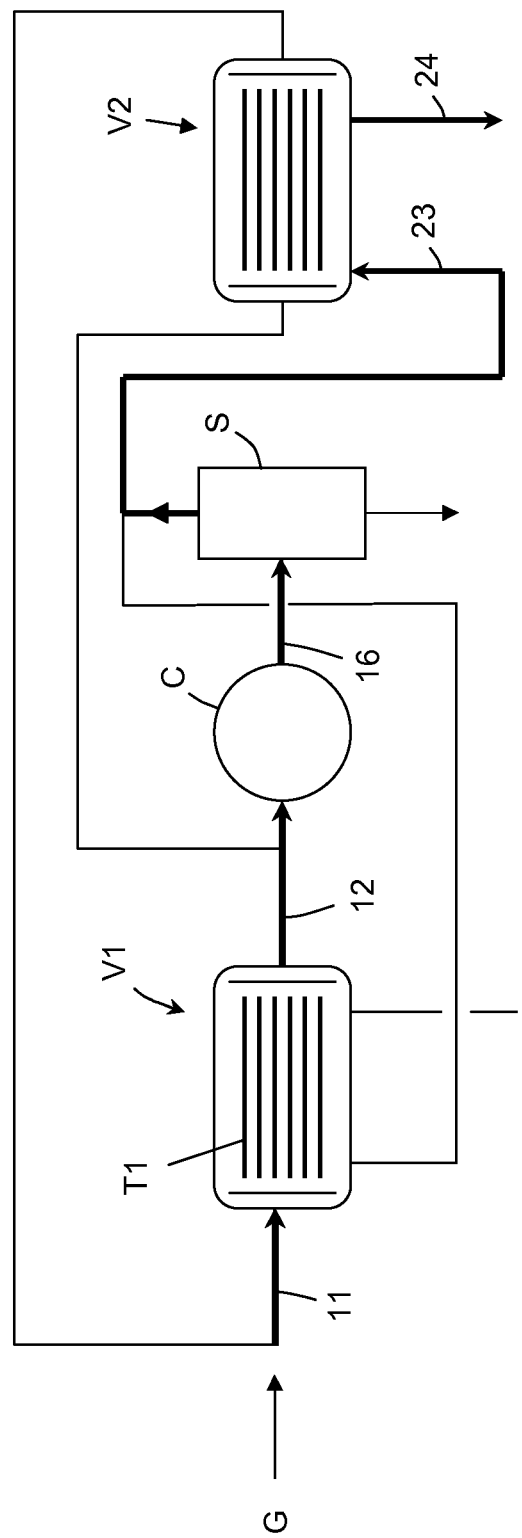
FIGS. 2 and 3 disclose modes of operation of the equipment of FIG. 1.
Figure 3:
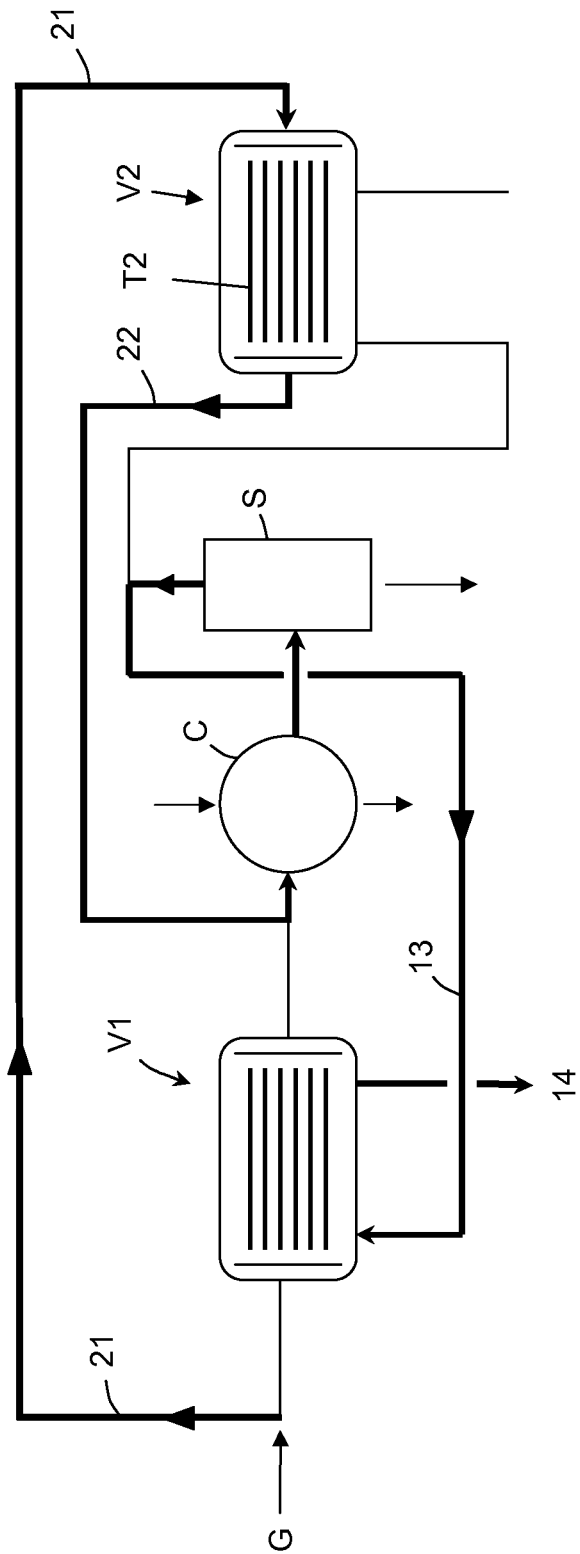

The related two modes of operation are elucidated in FIGS. 2 and 3 where the thicker lines show the path of gas G during the treatment.

In FIG. 2, the adsorbent bed B1 of vessel V1 is already saturated with CO2 and the adsorbent bed B2 of vessel V2 is ready to capture CO2, e.g. having been regenerated in a previous step. Hence, the incoming process gas G is directed via line 11 in the tube bundle T1, in order to regenerate the bed B1. The indirect heat exchange has the double advantage of heating the bed for regeneration, and cooling the process gas G to a lower temperature for contact with the bed B2.

As long as the hot process gas passes through tubes T1, carbon dioxide is released by the bed B1. In this stage, any connection with the shell side of vessel V1, such as lines 13 and 14, is closed. Hence the CO2 is released in a closed volume and the pressure inside vessel V1 increases. Once the regeneration of bed B1 is complete, a CO2-rich gas is available in the shell side of V1 at a certain pressure, for example 1.5 bars if starting pressure is 1 bar. Said CO2-rich gas may contain the released carbon dioxide plus some residual gas from a previous step of CO2 capture. Said pressure is the driving force for the recovery from the vessel; the line 14 can be opened to easily discharge said CO2-rich gas for a further use, the process gas continues to flow on the tube side until the pressure on the shell side has been completely released, in order to maintain the temperature on the shell side, otherwise the temperature would drop together with the pressure, on the process side, causing at least some of the CO2 to be re-adsorbed on the adsorbent.

The process gas G, still with the full content of CO2, leaves the tubes of vessel V1 via line 12 and passes through the cooler C for a further cooling, preferably to ambient or near-ambient temperature (e.g. 30-40° C.). Line 18 denotes a cooling medium such as air or water, which does not come into contact the process gas. After a passage in separator S (line 16), the cool process gas now enters the shell side of vessel V2 via line 23. Here, the process gas is contacted with bed B2, the CO2 is adsorbed and decarbonated gas is obtained at line 24.

Said decarbonated gas at line 24 can be used to cool the previously regenerated bed B1. In fact, the bed has a high temperature (e.g. 200° C.) after regeneration; use of the decarbonated gas as cooling medium is advantageous because it avoids the need of external cooling means such as air or water. Of course the temperature of decarbonated gas will also increase; in some cases, the availability of the decarbonated gas at a certain temperature may be an additional advantage, e.g. if said gas is directed to a further use.

Once the first bed B1 is regenerated and/or the second bed B2 is saturated, the CO2 removal section is switched to mode of FIG. 3. In this mode the incoming gas G is directed via the line 21 inside tubes T2, i.e. in the tube side of vessel V2, and leaves said tubes via line 22. Then the cooled gas passes through cooler C and separator S, and enters the shell side of vessel V1 via line 13 for contact with the bed B1 and CO2 removal. The decarbonated gas now exits at line 14, while CO2 will be recoverable by means of line 24.

It has to be understood that the figures show one vessel V1 and one vessel V2 but equivalent embodiments are possible with multiple vessels in parallel. Moreover, tube bundles T1 and T2 may be replaced with heat exchange plates or other heat exchange bodies arranged inside the vessels, provided they define a path for a heating or cooling medium isolated from the shell side.

The invention claimed is:

1. A process for removing carbon dioxide from a process gas, with a solid adsorbent and temperature swing adsorption, wherein:
   carbon dioxide removal from said process gas takes place alternately in at least a first bed of said solid adsorbent and a second bed of said solid adsorbent, the first bed being regenerated while carbon dioxide contained in the incoming process gas is adsorbed in the second bed and vice-versa, so that the adsorbent material of said first bed and said second bed is alternately loaded with carbon dioxide,
   the incoming process gas is cooled by an indirect heat exchange with the $CO_2$-loaded adsorbent of either said first bed or said second bed, thus heating and regenerating said $CO_2$-loaded adsorbent, and
   carbon dioxide is then removed from the cooled process gas while contacting said gas with adsorbent of the other bed; and
   wherein the bed(s) of $CO_2$-loaded adsorbent are kept in a closed environment while heated and regenerated by the indirect heat exchange with said process gas, so that heating of the $CO_2$-loaded adsorbent takes place in a constant volume, and pressure inside said closed environment increases while the carbon dioxide is released from said adsorbent.

2. The process according to claim 1, wherein said step of heating the adsorbent is maintained while the $CO_2$ released by the adsorbent leaves said closed environment, in order to keep a substantially constant temperature of said environment while the pressure is being reduced.

3. The process according to claim 1, wherein the bed adsorbing the CO2 is indirectly cooled to remove the heat of adsorption, increasing the quantity of $CO_2$ being adsorbed.

4. The process according to claim 1, where said indirect heat exchange between process gas and a $CO_2$-loaded adsorbent bed is effected by passing the process gas inside heat exchange bodies immersed in said bed, the bed being contained in a shell side of a vessel.

5. The process according to claim 4, wherein said heat exchange bodies are tubes or hollow plates.

6. The process according to claim 1, wherein the process gas, after a first cooling due to said indirect heat exchange with $CO_2$-loaded adsorbent, is subject to a second cooling process, and any condensed water is removed, before said process gas being contacted with an adsorbent bed for $CO_2$ removal.

7. The process according to claim 1, wherein after completion of the regeneration of said first bed or second bed, respectively, the bed is cooled by an indirect heat exchange with a cooling medium.

8. The process according to claim 7, wherein said cooling medium is a stream of de-carbonated process gas.

9. The process according to claim 1, wherein the incoming process gas has a temperature of at least 80° C.

10. The process according to claim 9, where incoming process gas is cooled to 60-80° C. while heating and regenerating the $CO_2$-loaded adsorbent of the first or second bed; the gas is then further cooled to 30-40° C. by heat exchange with a suitable cooling medium, and said further cooled gas is contacted with the unloaded adsorbent of the other bed.

11. The process according to claim 1, where adsorption of carbon dioxide in the unloaded adsorbent takes place at ambient pressure of around 1 bar abs.

12. The process according to claim 1, wherein said process gas is a gas from reforming or partial oxidation of a hydrocarbon, for use as make-up gas for the synthesis of methanol or ammonia.

13. An equipment for carrying out a process of carbon dioxide removal from a gas current, the equipment comprising:
  at least a first vessel for carbon dioxide removal containing a first bed of solid adsorbent material and first heat exchange bodies immersed in said first bed,
  at least a second vessel for carbon dioxide removal containing a second bed of solid adsorbent material and second heat exchange bodies immersed in said second bed,
  the heat exchange bodies defining an inside path for a heat exchange medium, and each of said vessels thus having a shell side and a heat-exchanger side, a medium flowing in the shell side being in direct contact with the adsorbent material, and a medium in the heat-exchanger side being separated from the adsorbent material,
  the equipment also comprising means for selective direction of an incoming gas current containing carbon dioxide either:
  according to a first path where the incoming gas passes first in the heat-exchange side (T1) of the first vessel for regeneration of the adsorbent material in the first vessel, and afterwards in the shell side of the second vessel for contact with said second bed and $CO_2$ removal,
  or according to a second path where the incoming gas passes first in the heat-exchange side of the second vessel for regeneration of the adsorbent material in the second vessel, and afterwards in the shell side of the first vessel for contact with said first bed and $CO_2$ removal;
  comprising means for isolating the shell side of the first or second vessel while the regeneration is in progress, so that a gas containing $CO_2$ is accumulated under pressure in said isolated shell side of first or second vessel, and discharge means which can be opened to discharge said gas containing $CO_2$.

14. The process according to claim 9, wherein the incoming process gas has a temperature in the range 100-300° C.

\* \* \* \* \*